United States Patent
Yoshida et al.

(10) Patent No.: US 12,447,752 B2
(45) Date of Patent: Oct. 21, 2025

(54) INK JET RECORDING METHOD AND INK JET RECORDING APPARATUS

(71) Applicant: CANON KABUSHIKI KAISHA, Tokyo (JP)

(72) Inventors: Masanori Yoshida, Chiba (JP); Yoshitaka Torisaka, Tokyo (JP); Satoshi Takebayashi, Tokyo (JP); Eriko Yoshino, Kanagawa (JP); Sayoko Nagashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 17/885,678

(22) Filed: Aug. 11, 2022

(65) Prior Publication Data

US 2023/0158809 A1 May 25, 2023

(30) Foreign Application Priority Data

Aug. 19, 2021 (JP) .................. 2021-134119
Aug. 19, 2021 (JP) .................. 2021-134120
(Continued)

(51) Int. Cl.
*B41J 2/21* (2006.01)
*B41M 3/00* (2006.01)
(Continued)

(52) U.S. Cl.
CPC .............. *B41J 2/211* (2013.01); *B41J 2/2114* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 8,389,600 B2   3/2013   Suzuki et al.
8,469,504 B2   6/2013   Saito et al.
(Continued)

FOREIGN PATENT DOCUMENTS

JP   2002-103783 A   4/2002
JP   2003-012975 A   1/2003
(Continued)

OTHER PUBLICATIONS

PubChem Compound Summary (1-2-Hydroxyethyl-2-pyrrolidinone; C6H11NO2; CID 76980-PubChem; Mar. 27, 2005; p. 1-36) (Year: 2005).*

*Primary Examiner* — Manish S Shah
(74) *Attorney, Agent, or Firm* — Venable LLP

(57) ABSTRACT

The present invention provides an ink jet recording method capable of recording an image having good abrasion resistance by using an aqueous ink and a reaction liquid. In the ink jet recording method, the aqueous ink containing a resin particle and the reaction liquid containing a reactant for aggregating the component in the aqueous ink are ejected from a recording head of the ink jet system and applied onto a recording medium. The reaction liquid contains a compound represented by the general formula (1) (n in the formula represents an integer of 0 to 3). At least one of the aqueous ink and the reaction liquid contains a surfactant having an HLB value of ≤15.

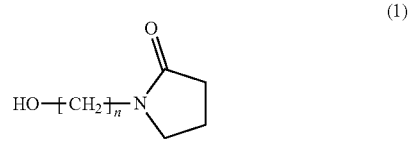

(1)

20 Claims, 2 Drawing Sheets

(30) Foreign Application Priority Data

Aug. 19, 2021 (JP) .................................. 2021-134121
Jul. 26, 2022 (JP) .................................. 2022-118745

(51) Int. Cl.
| | | |
|---|---|---|
| *B41M 5/00* | (2006.01) | |
| *B41M 7/00* | (2006.01) | |
| *C09D 11/107* | (2014.01) | |
| *C09D 11/322* | (2014.01) | |
| *C09D 11/38* | (2014.01) | |
| *C09D 11/40* | (2014.01) | |
| *C09D 11/54* | (2014.01) | |

(52) U.S. Cl.
CPC .......... *C09D 11/107* (2013.01); *C09D 11/322* (2013.01); *C09D 11/38* (2013.01); *C09D 11/40* (2013.01); *C09D 11/54* (2013.01); *B41M 3/001* (2013.01); *B41M 5/0047* (2013.01); *B41M 5/0064* (2013.01); *B41M 7/0018* (2013.01); *B41M 7/009* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 8,834,621 B2 | 9/2014 | Takebayashi et al. | |
| 9,187,662 B2 | 11/2015 | Yamamoto et al. | |
| 9,574,099 B2 | 2/2017 | Kawabe et al. | |
| 9,738,803 B2 | 8/2017 | Horiuchi et al. | |
| 9,969,182 B2 | 5/2018 | Torisaka et al. | |
| 10,017,656 B2 | 7/2018 | Torisaka et al. | |
| 10,065,412 B2 | 9/2018 | Shinjo et al. | |
| 10,233,343 B2 | 3/2019 | Takebayashi et al. | |
| 10,259,248 B2 | 4/2019 | Okuda et al. | |
| 10,259,964 B2 | 4/2019 | Nagashima et al. | |
| 10,525,754 B2 | 1/2020 | Tominaga et al. | |
| 10,688,787 B2 | 6/2020 | Kaji et al. | |
| 10,710,365 B2 | 7/2020 | Takebayashi et al. | |
| 11,001,080 B2 | 5/2021 | Sanada et al. | |
| 11,104,820 B2 | 8/2021 | Abe et al. | |
| 2003/0064206 A1* | 4/2003 | Koyano | B41M 5/0017 428/195.1 |
| 2004/0155946 A1* | 8/2004 | Nagai | C09D 11/40 347/100 |
| 2004/0202837 A1* | 10/2004 | Takashima | B41M 5/5227 428/328 |
| 2004/0258940 A1* | 12/2004 | Ogino | G03G 7/0073 428/537.7 |
| 2006/0203055 A1* | 9/2006 | Doi | C09D 11/54 347/96 |
| 2006/0293410 A1* | 12/2006 | Tokita | C09D 11/54 106/31.27 |
| 2008/0233363 A1* | 9/2008 | Goto | C09D 11/30 427/256 |
| 2010/0034972 A1 | 2/2010 | Mukae et al. | |
| 2010/0245508 A1* | 9/2010 | Ikeda | B41M 5/0011 347/95 |
| 2013/0187999 A1* | 7/2013 | Shinjo | C09D 11/38 347/100 |
| 2014/0043393 A1* | 2/2014 | Takeuchi | B41J 11/002 347/21 |
| 2016/0280945 A1 | 9/2016 | Mukae et al. | |
| 2016/0368285 A1* | 12/2016 | Shinjo | B41M 5/0017 |
| 2019/0009591 A1 | 1/2019 | Yoshida et al. | |

FOREIGN PATENT DOCUMENTS

| | | |
|---|---|---|
| JP | 2010-018742 A | 1/2010 |
| JP | 2013-151593 A | 8/2013 |
| JP | 2015-045003 A | 3/2015 |
| JP | 2017-024365 A | 2/2017 |
| JP | 2018-138353 A | 9/2018 |
| JP | 2018-154805 A | 10/2018 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording method has been increasingly used in the field of sign and display, such as recording a poster and a large advertisement. In this field, a polyvinyl chloride sheet or a polyethylene terephthalate (PET) sheet is often used as a recording medium from the viewpoint of durability and a cost of the recording medium. These recording media have no or almost no aqueous ink absorbing layer on the recording surface, and are so-called non-absorbing recording media (recording media having no aqueous ink absorbability) or low-absorbing recording media (recording media having low aqueous ink absorbability). There is a need for an ink jet recording method which makes it possible to record on these recording media directly.

As a method for recording an image on the non-absorbing recording medium or the low-absorbing recording medium (these are collectively referred to as a "non-absorbing recording medium" hereinafter), a recording method using a non-aqueous ink containing an organic solvent as a main component and a recording method using an ink to be cured by an energy ray such as UV light are known. However, these recording methods have many problems in terms of environmental load and odor since the non-aqueous ink uses a volatile organic solvent and has odor, and the ink to be cured by UV light requires UV irradiation when a polymerizable monomer is used or the ink is fixed. In addition, a decomposed substance such as an organic solvent and a polymerizable monomer remains on the image on a recorded article obtained by these recording methods, and odor may become a major problem depending on the use environment of the recorded article, for example, where the recorded article is displayed in a room.

For this reason, a recording method capable of recording on the non-absorbing recording medium using the aqueous ink has been studied. Since the non-absorbing recording medium has no or almost no ink absorbing layer, it is difficult to develop a high-definition image quality when the non-absorbing recording medium is used. As a method for improving the quality of the image on the non-absorbing recording medium, there has been proposed the ink jet recording method in which the reaction liquid containing the flocculant for aggregating the component in the ink is applied onto the recording medium, and then the aqueous ink is applied thereto (refer to Japanese Patent Application Laid-Open No. 2018-138353).

In addition, in the field of sign and display, the surface of the recorded article is strongly rubbed with a tool such as a scraper when the recorded article is displayed on a wall, and many people touch the recorded article when displayed outdoors, so the recorded article is required to have higher abrasion resistance than the photograph or the graphic art recorded by a conventional ink jet system. As a method for improving abrasion resistance of the image recorded on a non-absorbing recording medium, a method in which a reaction liquid and an aqueous ink containing a resin particle are used, and a nitrogen-containing solvent is further contained in the aqueous ink has been proposed (refer to Japanese Patent Application Laid-Open No. 2018-154805).

Further, a method of recording an image of white color or the like by applying an ink containing an inorganic oxide colloid onto a recording medium after a reaction liquid is applied onto the recording medium has been proposed (refer to Japanese Patent Application Laid-Open No. 2002-103783). Japanese Patent Application Laid-Open No. 2002-103783 discloses that a nitrogen-containing solvent may be contained in the reaction liquid.

A higher level of abrasion resistance is required for the image in the above-described fields. As a result of the examination by the inventors of the present invention, it is found that in the ink jet recording method using an aqueous ink and a reaction liquid in the prior art, abrasion resistance of an image does not reach a sufficiently high level, and there is room for improvement.

SUMMARY OF THE INVENTION

It is an object of the present invention to provide the ink jet recording method capable of recording an image having good abrasion resistance using an aqueous ink and a reaction liquid. Another object of the present invention is to provide an ink jet recording apparatus which can be used in the ink jet recording method.

The above object is achieved by the following present invention. That is, the present invention discloses an ink jet recording method in which an aqueous ink containing a resin particle and a reaction liquid containing a reactant for aggregating a component in the aqueous ink are ejected from a recording head of an ink jet system and applied onto a recording medium, wherein the reaction liquid contains a compound represented by following general formula (1), and at least one of the aqueous ink and the reaction liquid contains a surfactant having an HLB value of 15 or less.

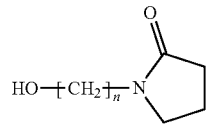

(1)

(In the general formula (1), n represents an integer of 0 to 3.)

Further features of the present invention will become apparent from the following description of exemplary embodiments with reference to the attached drawings.

DESCRIPTION OF THE EMBODIMENTS

Figure 1:
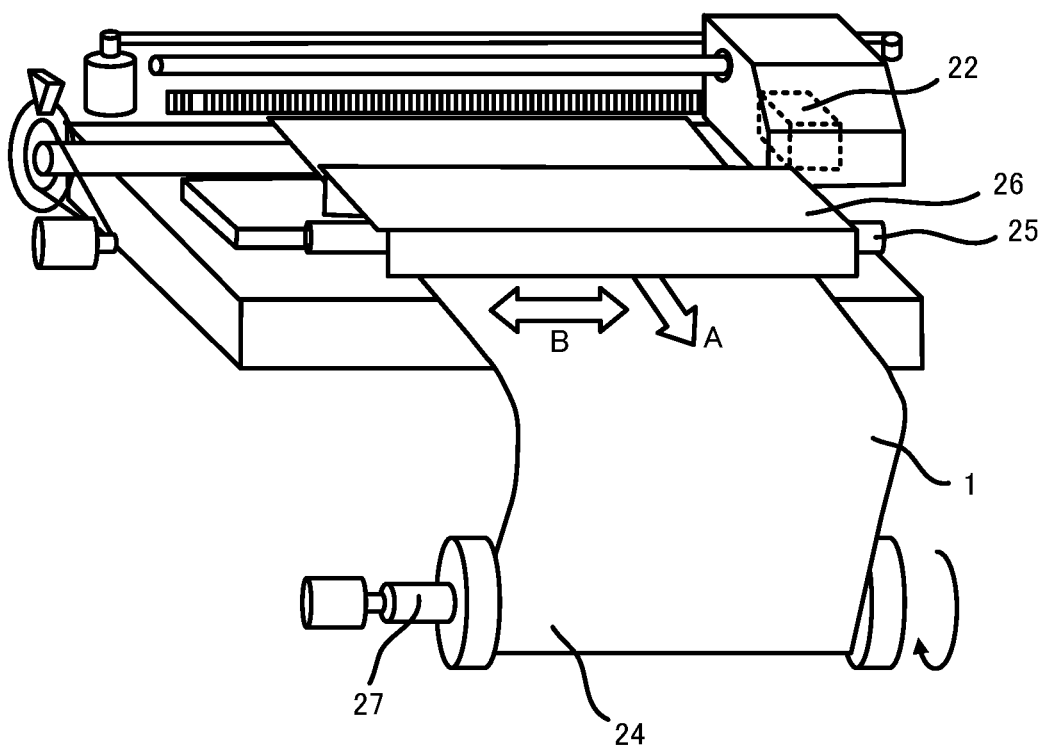
FIG. 1 is a perspective view for illustrating an example of an ink jet recording apparatus which can be used in the ink jet recording method according to an embodiment of the present invention.

The present invention is described in more detail with reference to preferred embodiments below. In the present invention, when the ink contains a salt, although the salt is dissociated into ions in an ink, it is referred to as "containing salt" for convenience. In addition, an aqueous ink of the ink jet system may be simply referred to as an "ink". A physical property value is a value at normal temperature (25° C.) unless otherwise specified.

The inventors of the present invention studied a method for obtaining an image having good abrasion resistance in the ink jet recording method using an aqueous ink containing a resin particle and a reaction liquid containing a reactant for aggregating the component in the ink. As a result, it was found that a desired image could be obtained by including the compound represented by the general formula (1), which will be described later, in the reaction liquid, and including a surfactant having the HLB value of 15 or less in at least one of the ink and the reaction liquid. The inventors of the present invention consider the reason why an image having good abrasion resistance can be obtained by the above means as follows.

First, when a solid image recorded by using the ink containing a resin particle and the reaction liquid was observed, many portions in which a recording medium was not colored by a coloring material of the ink and remained unprinted (a white void) were observed. On the other hand, when an image was recorded by using only the ink, without the reaction liquid, no white void was observed. The reaction liquid contains a reactant for aggregating the coloring material and the resin particle in the ink, and serves to fix the ink when the ink and the reaction liquid react on the recording medium. Therefore, when the ink and the reaction liquid are used together, the ink is less likely to wet and spread than when only the ink is used without the reaction liquid, and it is presumed that the white void tends to occur when the ink and the reaction liquid are both used.

The inventors of the present invention considered that since the contact area between an ink dot and the recording medium was reduced due to the white void, the adhesion of the ink dot to the recording medium was reduced, so that an image having good abrasion resistance could not be obtained. Therefore, the inventors considered that the surface tension of the ink could be lowered by including a surfactant having a small HLB value in the ink, so that the wettability of the ink to the recording medium could be increased and abrasion resistance of an image could be improved. As a result of the study, although it was possible to slightly improve the abrasion resistance by increasing the wettability of the ink and suppressing the occurrence of the white void, the abrasion resistance did not reach a sufficiently high level. It was found that the film forming property of the resin particle was insufficient by observing the surface of the image of the recorded article in detail. It is considered that when the film forming property of the resin particle is low, the fusion force between the resin particles becomes low, and the strength of the image which is formed when the ink is dried does not become sufficient.

By heating the recording medium onto which the ink is applied, the film forming property of the resin particle can be easily enhanced. However, in this case, it is assumed that the heating unit is added and the power consumption for heating is increased. In order to enhance the film forming property of the resin particle without heating, 2-pyrrolidone which is a water-soluble organic solvent in which the solubility of the resin particle is high was added to the ink. However, abrasion resistance of an image was not improved. A detailed observation of the surface of the image of the recorded article showed that the film forming property of the resin particle was improved, but a white void occurred. The reasons for this are considered as follows. 2-Pyrrolidone has a high affinity for a surfactant having a low HLB value, and suppresses orientation of the surfactant to the interface between the ink dot and the recording medium and the interface between the air layer and the ink dot (hereinafter, these are simply referred to as an "interface" collectively). As a result, it is presumed that the wettability of the ink to the recording medium did not increase and a white void occurred, so that abrasion resistance of an image was not improved.

Based on the above study, the inventors of the present invention considered that abrasion resistance of an image could be improved by lowering the affinity between the water-soluble organic solvent and the surfactant. As a result of various studies carried out, it was found that abrasion resistance of an image could be remarkably improved by including the surfactant having the HLB value of 15 or less in the ink and/or in the reaction liquid and including the compound represented by the general formula (1) as the water-soluble organic solvent in the reaction liquid. The compound represented by the general formula (1) has a pyrrolidone skeleton capable of enhancing the solubility of the resin particle. In addition, the compound represented by the general formula (1) has a hydroxy group (when n in the general formula (1) is 0) or a hydroxyalkyl group (when n in the general formula (1) is an integer of 1 to 3), which is a hydrophilic group. Therefore, the compound has a low affinity for a surfactant having high hydrophobicity which has the HLB value of 15 or less. As a result, it is presumed that the surfactant was easily oriented to the interface and the wettability of the ink to the recording medium was improved.

Further, detailed observation of the surface of the image of the recorded article revealed that the film forming property of the resin particle was greatly improved. The reasons for this are considered as follows. As described above, the compound represented by the general formula (1) tends to enhance the solubility of the resin particle. In addition, since the surfactant and the compound represented by the general formula (1) have a low affinity for each other, the surfactant is oriented not only to the interface but also to the resin particle. As a result, it is presumed that the surfactant entered into the molecular chain of the resin forming the resin particle and loosened the entanglement of the molecular chain, so that the film forming property of the resin particle was improved. As described above, it is considered that by using the compound represented by the general formula (1) and making the surfactant efficiently oriented to the interface and the resin particle, it was possible to improve the wettability of the ink to the recording medium and the film forming property of the resin particle, and abrasion resistance of an image was remarkably improved.

It was found that when the compound represented by the general formula (1) was contained in the ink, not in the reaction liquid, it was difficult to obtain the effect of improving abrasion resistance as compared with the case where the compound was contained in the reaction liquid. The inventors of the present invention speculate the reason as follows. When the compound represented by the general formula (1) is present only in the ink, the resin particle in the ink incorporates the compound represented by the general formula (1) within the molecular chain of the resin, and the resin particle tends to swell in the ink. It is presumed that the rapid dissolution of the resin particle, which is supposed to occur when the resin particle contacts with the compound represented by the general formula (1) which is brought by the reaction liquid on the recording medium, is somewhat less likely to occur, and therefore, the effect of improving abrasion resistance is not obtained. As described above, it is important that the compound represented by the general formula (1) is contained in the reaction liquid.

<Ink Jet Recording Method and Ink Jet Recording Apparatus>

The ink jet recording method of the present invention includes a step of ejecting an aqueous ink containing a resin particle and a reaction liquid for aggregating the component in the aqueous ink from a recording head of the ink jet system to apply onto a recording medium. In addition, an ink jet recording apparatus of the present invention is equipped with the aqueous ink, the reaction liquid and the recording head of the ink jet system which ejects the aqueous ink and the reaction liquid to apply them onto the recording medium. It is not necessary to perform a step of curing an image by irradiation with an active energy ray or the like. The present invention is not limited to the following description as long as the gist thereof is not exceeded.

[Aqueous Ink]

In the ink jet recording method and the ink jet recording apparatus of the present invention, an aqueous ink containing a resin particle is used. The resin particle forms a film and has a role of imparting physical strength to an image. Hereinafter, each component contained in the ink or the like is described in detail.

(Resin Particle)

The ink contains a resin particle. The term "resin particle" as used in this specification refers to a resin that exists in a state where it is not dissolved in an aqueous medium contained in the ink, and specifically refers to a resin that can exist in the aqueous medium in a state where a particle of which a particle diameter can be measured by a dynamic light scattering method is formed. On the other hand, the term "water-soluble resin" means a resin which exists in a state of being dissolved in an aqueous medium contained in the ink, and specifically means a resin which can exist in the aqueous medium in a state where a particle of which a particle diameter can be measured by a dynamic light scattering method is not formed. The resin particle is expressed as a "water-dispersible resin (water-insoluble resin)", when expressed in pairs with the "water-soluble resin".

Whether a certain resin is the "resin particle" defined above or not can be determined according to the following method. First, a liquid containing the resin to be determined (the resin content: 10% by mass) is prepared. The liquid is then diluted 10 times (on a volume basis) with pure water to prepare a sample. If a particle having a particle diameter can be observed when the particle diameter of a resin particle in the sample is measured by the dynamic light scattering method, the resin can be determined as the "resin particle" (that is, the "water-dispersible resin"). On the other hand, if a particle having a particle diameter cannot be observed, the resin can be determined not to be the "resin particle" (the resin can be determined as the "water-soluble resin"). As a particle size distribution measuring apparatus of the dynamic light scattering method, a particle diameter analyzer (for example, the product name "UPA-EX150," manufactured by Nikkiso Co., Ltd.) or the like can be used. The measurement conditions may be, for example, the SetZero: 30 seconds, the number of measurements: 3 times, the measurement time: 180 seconds, the shape: true spherical shape and the refractive index: 1.59. Of course, the particle diameter analyzer and the measurement conditions are not limited to those described above.

Examples of the material of the resin forming the resin particle include an acrylic resin, a urethane resin, a polyester resin, an olefin resin and a styrene resin. Among them, an acrylic resin, a urethane resin and a polyester resin are preferable. In the following description, the term "(meth)acrylic acid" refers to an "acrylic acid or/and methacrylic acid", and the term "(meth)acrylate" refers to an "acrylate or/and methacrylate".

[Acrylic Resin]

The acrylic resin of this specification includes a unit derived from at least one of (meth)acrylic acid and a (meth)acrylic acid ester monomer, and is the resin obtained by (co)polymerizing a monomer component containing an acrylic monomer. As the acrylic resin, the resin which is obtained by copolymerizing a monomer having an acid group and a monomer having no acid group, and composed by a unit having an acid group and a unit having no acid group is preferably used.

Examples of the monomer having an acid group which becomes the unit having an acid group by polymerization include a monomer having a carboxy group such as (meth)acrylic acid, maleic acid, itaconic acid and fumaric acid; a monomer having a sulfo group such as styrenesulfonic acid; a monomer having a phosphonate group such as 2-(phosphoric acid)-ethyl (meth)acrylate; and an anhydride and a salt of these monomers. Examples of the salt include an alkali metal salt such as lithium, sodium and potassium, an ammonium salt and an organic ammonium salt. Among them, an alkali metal salt such as lithium, sodium and potassium is preferable. As the monomer having an acid group, a monomer having a carboxy group is preferable, and (meth)acrylic acid is more preferable.

Examples of the monomer having no acid group which becomes the unit having no acid group by polymerization include a monomer having a hydroxy group such as 2-hydroxyethyl (meth)acrylate, 3-hydroxypropyl (meth)acrylate and 3-methyl-5-hydroxypentyl (meth)acrylate; a monomer having an aromatic group such as styrene, α-methylstyrene and benzyl (meth)acrylate; an alkyl (meth)acrylate such as methyl (meth)acrylate, ethyl (meth)acrylate, isopropyl (meth)acrylate, n-butyl (meth)acrylate, isobutyl (meth)acrylate, tert-butyl (meth)acrylate and 2-ethylhexyl (meth)acrylate. As the monomer having no acid group, a monomer having an aromatic group and an alkyl (meth)acrylate are preferable, and a monomer having an aromatic group is more preferable.

[Urethane Resin]

The urethane resin is a resin synthesized by using at least a polyisocyanate and a component reacting with the polyisocyanate (such as polyol or polyamine), and also using a crosslinking agent or a chain extender if necessary. Preferably, the urethane resin obtained by polymerizing the polyisocyanate, a polyol having no acid group and a polyol having an acid group is used.

The polyisocyanate is a compound having two or more isocyanate groups in its molecular structure. Examples of the polyisocyanate include an aliphatic polyisocyanate and an aromatic polyisocyanate. Examples of the aliphatic polyisocyanate include a polyisocyanate having a chain structure such as tetramethylene diisocyanate and hexamethylene diisocyanate; and a polyisocyanate having a cyclic structure such as isophorone diisocyanate and hydrogenated xylylene diisocyanate. Examples of the aromatic polyisocyanate include tolylene diisocyanate and 1,5-naphthylene diisocyanate. Among them, the polyisocyanate is preferably an isophorone diisocyanate.

The polyol is a compound having two or more hydroxy groups in its molecular structure. Examples of the polyol include a polyol having no acid group such as a polyether polyol, a polyester polyol and a polycarbonate polyol; and a polyol having an acid group. In addition, the polyamine is a compound having two or more "amino groups or/and imino groups" in its molecular structure. Examples of the polyether polyol include an addition polymer of an alkylene oxide and a polyol; and a glycol such as a (poly)alkylene glycol. Examples of the polyester polyol include an acid ester. Examples of the polycarbonate polyol include an alkanediol-based polycarbonate diol. The number average molecular weight of the polyol having no acid group is preferably 400 or more to 4,500 or less.

Examples of the acid group contained in the polyol include a carboxy group, a sulfo group, a phosphate group and a phosphonate group. The acid group may form a salt, for example, an alkali metal salt such as lithium, sodium and potassium, an ammonium salt and an organic ammonium salt. Among them, an alkali metal salt such as lithium, sodium and potassium is preferable. As the monomer having an acid group, a polyol having a carboxy group such as dimethylol acetic acid, dimethylol propionic acid, dimethylol butanoic acid and dimethylol butyric acid is preferable, and dimethylol propionic acid and dimethylol butanoic acid are more preferable.

Examples of the polyamine include a monoamine having multiple hydroxy groups such as dimethylolethylamine and diethanolmethylamine; a bifunctional polyamine such as ethylenediamine and propylenediamine; and a tri- or higher functional polyamine such as diethylenetriamine and triethylenetetramine. For convenience, a compound having multiple hydroxy groups and one "amino group or/and imino group" is also listed as the "polyamine."

When the urethane resin is synthesized, a crosslinking agent or a chain extender can be used. Typically, the crosslinking agent is used in the synthesis of prepolymers, and the chain extender is used in the chain extension reaction of the prepolymers which are in advance synthesized. Basically, the crosslinking agent or the chain extender can be suitably selected from water, a polyisocyanate, a polyol, a polyamine or the like and used according to the purpose such as crosslinking and chain extension.

[Polyester Resin]

The polyester resin is a resin composed by a unit derived from a polyhydric alcohol and a unit derived from a polycarboxylic acid. Examples of the polyhydric alcohol of the unit composing the polyester resin include polyhydric alcohols of divalent to tetravalent. Examples of the structure of the polyhydric alcohol include a polyhydric alcohol having an aliphatic group, a polyhydric alcohol having an aromatic group and a sugar alcohol. Specific examples of the polyhydric alcohol include a dihydric alcohol such as ethylene glycol (another name: 1,2-ethanediol), neopentyl glycol (another name: 2,2-dimethyl-1,3-propanediol), 1,3-propanediol, 1,4-butanediol, benzenediol and 2,2-bis (4-hydroxyphenyl) propane (another name: bisphenol A); a trihydric alcohol such as glycerin, trimethylolethane and trimethylolpropane; and a tetravalent alcohol such as pentaerythritol. As the polyhydric alcohol, an oligomer (a low molecular weight polymer having a molecular weight of 1,000 or less) can also be used.

Since the weight average molecular weight of the polyester resin can be easily adjusted, a dihydric alcohol and a trihydric alcohol are preferably used. From the viewpoint of the structure, the polyhydric alcohol having an aliphatic group and the polyhydric alcohol having an aromatic group are preferably used. As the polyhydric alcohol having an aliphatic group, a linear or branched polyhydric alcohol having an aliphatic group having 1 to 6 carbon atoms is more preferably used. In particular, ethylene glycol, neopentyl glycol, bisphenol A and glycerin are preferable, and it is also preferable to use two or more of them together.

Examples of the polycarboxylic acid of the unit composing the polyester resin by reaction include polycarboxylic acids of divalent to tetravalent. Examples of the structure of the polycarboxylic acid include a polycarboxylic acid having an aliphatic group, a polycarboxylic acid having an aromatic group and a nitrogen-containing polycarboxylic acid. Specific examples of the polycarboxylic acid include a dicarboxylic acid such as glutaric acid, adipic acid, terephthalic acid, isophthalic acid and 2,6-naphthalenedicarboxylic acid; a tricarboxylic acid such as trimellitic acid; and a tetracarboxylic acid such as ethylenediaminetetraacetic acid. As the polycarboxylic acid, an oligomer (a low molecular weight polymer having a molecular weight of 1,000 or less) can also be used.

Since the weight average molecular weight and the acid value of the polyester resin can be easily adjusted, a dicarboxylic acid and a tricarboxylic acid are preferably used. From the viewpoint of the structure, a polycarboxylic acid having an aliphatic group and a polycarboxylic acid having an aromatic group are preferably used. In particular, adipic acid, terephthalic acid, isophthalic acid and trimellitic acid are preferably used, and it is also preferable to use two or more of them together.

[Analysis Method]

The resin particle is preferably analyzed based on the unit composing the resin which forms the resin particle. Examples of the method for analyzing the unit composing the resin include the following. First, the resin particle is dissolved in an organic solvent in which the resin particle can dissolve (for example, tetrahydrofuran) to prepare a sample. The resin particle to be used in this case may be in the state of an aqueous dispersion liquid or in the state of being dried. The obtained sample is analyzed by nuclear magnetic resonance (NMR) spectroscopy, matrix-assisted laser desorption ionization mass spectrometry (MALDI-MS) or the like. Thus, the type and the ratio of the unit (monomer) composing the resin can be found. Further, the resin particle itself can be analyzed by pyrolysis gas chromatography to detect the unit (monomer) composing the resin. In addition, when the sample is prepared, if an insoluble component which is not dissolved in the organic solvent is produced, the insoluble component can be analyzed by pyrolysis gas chromatography to detect the unit (monomer) composing the resin.

[Physical Properties]

The amount of an anionic group of the resin particle is preferably 350 mol/g or less. By using the resin particle having the above amount of an anionic group, a surfactant having the HLB value of 15 or less is easily oriented to the resin particle, and the film forming property of the resin particle is enhanced, so that abrasion resistance of an image is easily enhanced. The amount of an anionic group of the resin particle is preferably 50 mol/g or more. The anionic group is a group contained in the unit derived from the above-mentioned monomer, for example, a carboxy group, a sulfo group, a phosphonate group and the like. The amount of the anionic group of the resin particle can be determined by colloidal titration. In Examples to be described later, the amount of the anionic group of the resin particle was measured by colloidal titration using the potential difference by using an automatic potentiometric titrator (product name "AT-510", manufactured by Kyoto Electronics Manufacturing Co., Ltd.) equipped with a flow potential titration unit (PCD-500). Methylglycol chitosan was used as the titration reagent. The glass transition temperature (Tg) of the resin particle is preferably 0° C. or more to 100° C. or less, and more preferably 20° C. or more to 90° C. or less. The glass transition temperature of the resin particle can be determined as to the resin particle itself by using a differential scanning calorimeter.

[Content]

The content (% by mass) of the resin particle in the ink is preferably 1.0% by mass or more to 20.0% by mass or less based on the total mass of the ink, and more preferably 2.0% by mass or more to 15.0% by mass or less. Further, it is more preferable that the content is 5.0% by mass or more to 10% by mass or less.

(Other Resin)

The ink may further contain a resin (another resin) other than the resin particle described above. The type and form of the other resin may be any type and form as long as the resin can be stably present in the aqueous ink. Examples of the other resin include an acrylic resin, a urethane resin, a polyester resin, an olefin resin, a polyamide resin, a polyvinyl alcohol resin and a styrene resin. In order to improve the solubility of the resin, it is preferable that the resin has a salt-type anionic group. Examples of a cation that forms the salt of the anionic group include an organic amine cation such as monoethanolamine, diethanolamine, triethanolamine, amine methylpropanol and N,N-dimethylethanolamine; and an alkali metal ion such as potassium and sodium. Among them, the alkali metal ion is preferable. The form of the other resin is preferably a water-soluble resin.

(Aqueous Medium)

The ink is an aqueous ink containing at least water as an aqueous medium. The ink may contain an aqueous medium which is a mixed solvent of water and a water-soluble organic solvent. From the viewpoint of odor or the like, the ink preferably contains 50.0% by mass or more of water as the aqueous medium. As the water, deionized water or ion-exchanged water is preferably used. The content (% by mass) of the water in the ink is preferably 50.0% by mass or more to 90.0% by mass or less based on the total mass of the ink.

As the water-soluble organic solvent, any one usable for the ink of the ink jet system such as an alcohol, a polyol, a (poly)alkylene glycol, a glycol ether, another nitrogen-containing compound and a sulfur-containing compound can be used. Further, one or more of these water-soluble organic solvents can be contained in the ink. The content (% by mass) of the water-soluble organic solvent in the ink is preferably 5.0% by mass or more to 40.0% by mass or less based on the total mass of the ink, and more preferably 15.0% by mass or more to 30.0% by mass or less. By making the content of the water-soluble organic solvent in the ink within the above range, the ink can be ejected stably. The content of the water-soluble organic solvent includes the content of the compound represented by the general formula (1) which can be contained in the ink as needed.

Further, the ink preferably contains the compound represented by the general formula (1). In the ink containing the compound represented by the general formula (1), the resin particle takes the compound represented by the general formula (1) into the molecular chain of the resin, and the resin particle tends to swell in the ink. When the resin particle in the swollen state comes into contact with the compound represented by the general formula (1) in the reaction liquid on the recording medium, the resin particle becomes likely to be dissolved rapidly and the film forming property of the resin particle becomes higher, so that abrasion resistance of an image can be further improved. The content (% by mass) of the compound represented by the general formula (1) in the ink is preferably 1.0% by mass or more to 20.0% by mass or less based on the total mass of the ink. When the ink contains the compound represented by the general formula (1), it is preferable that the ink also contains the water-soluble organic solvent other than the compound represented by the general formula (1).

(Coloring Material)

The ink may not contain a coloring material, but may contain a coloring material such as a pigment or a dye. When the ink contains a coloring material, the content (% by mass) of the coloring material in the ink is preferably 0.1% by mass or more to 15.0% by mass or less based on the total mass of the ink, and more preferably 1.0% by mass or more to 10.0% by mass or less.

When a pigment is used as the coloring material, the type of the pigment is not particularly limited. Specific examples of the pigment include an inorganic pigment such as carbon black and titanium oxide; and an organic pigment such as azo, phthalocyanine, quinacridone, isoindolinone, imidazolone, diketopyrrolopyrrole and dioxazine. The ink may contain one or more kinds of pigments. Among them, carbon black and the organic pigment are preferably used as the pigment. The ink containing these pigments has a black or color hue.

When the pigment is used as the coloring material, a resin-dispersed pigment using a resin as a dispersant (resin dispersant), a self-dispersible pigment in which a hydrophilic group is bonded to the surface of the particle of the pigment and the like can be used in a dispersion method of the pigment. Further, pigments such as a resin-bonded pigment in which an organic group containing a resin is chemically bonded to the surface of the particle of the pigment and a microcapsule pigment in which the surface of the particle of the pigment is coated with the resin or the like can be used. It is also possible to use a combination of the pigments dispersed by different dispersion methods. It is preferable to use a resin-dispersed pigment from the viewpoint that abrasion resistance of an image is likely to be better.

When a dye is used as the coloring material, the type of the dye is not particularly limited. Specific examples of the dye include a direct dye, an acid dye, a basic dye, a disperse dye and an edible dye. Specific examples of the dye skeleton include azo, triphenylmethane, phthalocyanine, azaphthalocyanine, xanthene and anthrapyridone. The ink may contain one or more kinds of dyes.

(Other Components)

The ink may contain a water-soluble organic compound which is solid at normal temperature (the temperature of 25° C.) such as urea or its derivative, trimethylolpropane and trimethylolethane if necessary, in addition to the components described above. Further, the ink may also contain various additives such as another surfactant, a pH adjusting agent, an antifoaming agent, a rust inhibitor, an antiseptic, an antifungal agent, an antioxidant, a reduction inhibitor, an evaporation accelerator, a chelating agent, and a water-soluble resin.

[Reaction Liquid]

In the ink jet recording method and the ink jet recording apparatus of the present invention, a reaction liquid containing a reactant for aggregating the component in the ink and the compound represented by the general formula (1) is used. The reaction liquid is preferably colorless and does not need to contain the coloring material. In addition, the reaction liquid preferably does not contain the resin (water-soluble resin, resin particle).

(Reactant)

The reactant is not particularly limited, and examples of the reactant include a polyvalent metal ion, a cationic resin and an organic carboxylic acid of an acid form. One or more kinds of these can be used. These reactants react with an anionic group of the component of the ink to aggregate the component. Examples of the component having an anionic group which is reactive with the reactant include a resin-dispersant for dispersing the pigment, a self-dispersible pigment in which an anionic group is bonded to the surface of the particle directly or via another atomic group, a resin particle and a water-soluble resin.

Examples of the polyvalent metal ion include an ion such as calcium, magnesium, copper, nickel, zinc, barium, aluminum, titanium, strontium, chromium, cobalt, and iron. Examples of the cationic resin include polyallylamine hydrochloride, polyamine sulfone hydrochloride, polyvinylamine hydrochloride and chitosan acetate.

Examples of the organic carboxylic acid of an acid form include the following, where a pKa is indicated in parentheses (if a compound has more than one pKa, the pKa of the first step dissociation reaction in which a hydrogen ion is released from an acid is indicated). A monocarboxylic acid such as formic acid (3.8), acetic acid (4.8), propionic acid (4.9), butyric acid (4.8), benzoic acid (4.2), glycolic acid (3.8), lactic acid (3.9), salicylic acid (3.0), pyrrolic carboxylic acid (4.6), furancarboxylic acid (3.2), nicotinic acid (4.9), levulinic acid (4.4) and coumaric acid (2.8); a dicarboxylic acid such as malonic acid (2.7), succinic acid (4.0), glutaric acid (4.3), adipic acid (4.4), maleic acid (1.8), fumaric acid (2.9), itaconic acid (3.9), sebacic acid (4.6), phthalic acid (2.9), malic acid (3.2) and tartaric acid (3.0); a tricarboxylic acid such as citric acid (2.8), trimellitic acid (2.5) and 1,2,3-propanetricarboxylic acid (3.5); and a tetracarboxylic acid such as pyromellitic acid (1.9).

Since the organic carboxylic acid of an acid form is a compact molecule among the reactants, it is easy to precipitate (bleed out) on the surface of the image. When the organic carboxylic acid precipitates on the surface of an image, the image may appear to have low abrasion resistance due to roughness. In such a case, by using the reaction liquid containing the compound represented by the general formula (1), it is possible to suppress deterioration of abrasion resistance due to precipitation of the organic carboxylic acid. The reasons for this may be considered as follows. The compound represented by the general formula (1) not only has an affinity with the resin particle, but also forms a hydrogen bond with a carboxy group of the organic carboxylic acid via its hydroxy group. Further, the compound represented by the general formula (1) has a sufficiently high boiling point and a low vapor pressure among the water-soluble organic solvents used for the aqueous ink of the ink jet system, so that it is unlikely to evaporate in a short period like water. Therefore, the resin particle and the organic carboxylic acid tend to exist adjacent to each other via the compound represented by the general formula (1), and the organic carboxylic acid is unlikely to precipitate on the surface of an image, thereby suppressing deterioration of abrasion resistance of the image.

Among the reactants, the organic carboxylic acid of an acid form having the pKa of 1.8 or more is preferably used. The organic carboxylic acid of an acid form aggregates the component of the ink by changing the anionic group of the component from the ion dissociation type to the H type and reducing the hydrophilicity of the component. In this case, the reaction of the organic carboxylic acid of an acid form having the pKa of 1.8 or more tends to proceed slowly. Further, as compared with a polyvalent metal ion and a cationic resin, the organic carboxylic acid of an acid form has fewer reaction points with the anionic group, so that an aggregate generated by the reaction tends to become smaller. In addition to the gentle progress of the reaction, since the aggregate generated by the reaction tends to be small, the surface of an image tends to be smooth, so that abrasion resistance of the image can be further improved. The pKa represents the ease of dissociation of the proton of the acid and is the negative common logarithm ($pKa=-\log_{10}Ka$) of the acid dissociation constant (Ka). The amount of the acid dissociated in the reaction liquid depends mainly on the pKa of the first step dissociation reaction in which a hydrogen ion is released from the acid. Therefore, in the case of the compound having more than one pKa, the pKa of the organic carboxylic acid of an acid form of the present invention refers to the pKa of the first step dissociation reaction in which a hydrogen ion is released from the acid. The pKa of the organic carboxylic acid of an acid form is preferably 4.9 or less.

Among the above organic carboxylic acids, a polycarboxylic acid having plurality of (two or more) carboxy groups is preferable because abrasion resistance of an image is easily improved. Since many polycarboxylic acids have higher water solubility than monocarboxylic acids, it is considered that precipitation caused by evaporation of the aqueous medium or evaporation of the acid is unlikely to occur before the polycarboxylic acid is applied onto the recording medium, and as a result, it is considered that the function of the polycarboxylic acid as the acid is unlikely to be deteriorated. Further, since the polycarboxylic acid has two or more carboxy groups, the hydrogen bond with the compound represented by the general formula (1) becomes stronger. As a result, since the polycarboxylic acid is more likely to exist in the vicinity of the compound represented by the general formula (1), the bleed out of the organic carboxylic acid to the surface of an image is more suppressed, and abrasion resistance of the image is more improved. The number of the carboxy groups of the polycarboxylic acid is preferably 4 or less.

The content (% by mass) of the reactant in the reaction liquid is preferably 0.1% by mass or more to 5.0% by mass or less based on the total mass of the reaction liquid, more preferably 0.5% by mass or more to 5.0% by mass or less, and still more preferably 1.0% by mass or more to 5.0% by mass or less.

(Aqueous Medium)

The reaction liquid is preferably an aqueous reaction liquid containing water from the viewpoint of odor and the like, and more preferably contains 50.0% by mass or more of water as the aqueous medium. As the water, deionized water or ion-exchanged water is preferably used. The content (% by mass) of the water in the reaction liquid is more preferably 50.0% by mass or more to 90.0% by mass or less based on the total mass of the reaction liquid.

The reaction liquid may further contain the water-soluble organic solvent as the aqueous medium. As the water-soluble organic solvent to be contained in the reaction liquid, the water-soluble organic solvent mentioned above in the description of the ink can be used. The content (% by mass) of the water-soluble organic solvent in the reaction liquid is preferably 5.0% by mass or more to 40.0% by mass or less based on the total mass of the reaction liquid, and more preferably 15.0% by mass or more to 30.0% by mass or less.

By making the content of the water-soluble organic solvent in the reaction liquid within the above range, it is possible to reduce the occurrence of poor ejection of the reaction liquid.

The reaction liquid contains the compound represented by the following general formula (1) as the water-soluble organic solvent.

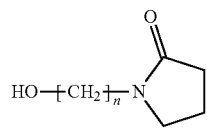
(1)

In the general formula (1), n represents an integer of 0 to 3. When n is 0, the hydroxy group directly bonds to the nitrogen atom via a single bond. The compound represented by the general formula (1) has a structure having both a pyrrolidone skeleton part and an N-position substituent part having a hydroxy group. In the compound represented by the general formula (1), the number of carbon atoms of the N-position substituent having a hydroxy group is 0 to 3. Specifically, N-hydroxy-2-pyrrolidone, N-hydroxymethyl-2-pyrrolidone, N-(2-hydroxyethyl)-2-pyrrolidone and N-(3-hydroxypropyl)-2-pyrrolidone can be used as the compound represented by the general formula (1).

When a compound having no N-position substituent in the compound represented by the general formula (1), namely 2-pyrrolidone, is used instead of the compound represented by the general formula (1), the effect of improving abrasion resistance of an image is not obtained. On the other hand, when a compound in which n in the general formula (1) is replaced to 4 or more is used instead of the compound represented by the general formula (1), the hydrophobicity of the hydroxyalkyl part increases and the affinity with the surfactant having the HLB value of 15 or less decreases. Therefore, since the surfactant is unlikely to be oriented to the interface or the resin particle, the effect of improving abrasion resistance of an image cannot be obtained.

The content (% by mass) of the compound represented by the general formula (1) in the reaction liquid is preferably 7.0% by mass or more to 31.0% by mass or less based on the total mass of the reaction liquid, and more preferably 10.0% by mass or more to 30.0% by mass or less.

(Other Components)

In addition to the above components, the reaction liquid may contain various additives such as another surfactant, a pH adjusting agent, a rust inhibitor, an antiseptic, an anti-fungal agent, an antioxidant, a reduction inhibitor, an evaporation accelerator, a chelating agent and a water-soluble resin, as needed.

[Surfactant]

At least one of the aqueous ink and the reaction liquid contains the surfactant having the HLB value of 15 or more. When neither the aqueous ink nor the reaction liquid contains the surfactant, a white void occurs in the obtained image, and the adhesion between the recording film and the recording medium is lowered, so that the effect of improving abrasion resistance of an image is not obtained. The surfactant may be contained in either the ink or the reaction liquid, or contained in both so that the surfactant is oriented to the interface in the ink dot in which the ink and the reaction liquid are mixed. If the HLB value of the surfactant is more than 15, the surfactant is dissolved in water, and not oriented to the interface or the resin particle, so that the effect of improving abrasion resistance of an image cannot be obtained. The HLB value of the surfactant is more preferably 12 or less. By using the surfactant having the HLB value of 12 or less, the surfactant is easily oriented to the interface or the resin particle, and the effect of improving abrasion resistance of an image is more easily obtained. The HLB value of the surfactant is preferably 10 or more.

In the present specification, the HLB value is a value calculated by the Griffin's method. The HLB value calculated by the Griffin's method can be obtained by the formula weight and the molecular weight of the hydrophilic group of the surfactant, using the following formula (A). The HLB value calculated by the Griffin's method represents the degree of hydrophilicity and lipophilicity of the surfactant and ranges from 0 to 20. The lower the HLB value is, the higher the lipophilicity of the surfactant is, and the higher the HLB value is, the higher the hydrophilicity is.

$$HLB\ value = 20 \times \text{formula amount of hydrophilic group of surfactant/molecular weight of surfactant} \qquad (A)$$

The surfactant having the HLB value is a nonionic surfactant. Examples of the surfactant having the HLB value of 15 or less include a hydrocarbon surfactant such as a polyoxyethylene alkyl ether, an ethylene oxide adduct of acetylene glycol; a fluorine surfactant such as a perfluoroalkyl ethylene oxide adduct; and a silicone surfactant such as a polyether-modified siloxane compound. One or more surfactants having the HLB value of 15 or less can be used.

The surfactant preferably contains the hydrocarbon surfactant, and more preferably contains the polyoxyethylene alkyl ether. In the polyoxyethylene alkyl ether, an ethylene oxide group which is the hydrophilic group and a long chain alkyl group which is the hydrophobic group are clearly separated, and the long chain alkyl group part is easily oriented to the resin particle, and abrasion resistance of an image is easily improved.

The content (% by mass) of the surfactant having an HLB value of 15 or less is preferably 1.0% by mass or less based on the total mass of the ink containing the surfactant or the reaction liquid containing the surfactant. Thereby, since a micelle generated by aggregation of the surfactant in the ink or the reaction liquid is unlikely to be formed, the surfactant is easily oriented to the interface or the resin particle, and abrasion resistance of an image is easily improved. Further, the content (% by mass) of the surfactant having the HLB value of 15 or less is preferably 0.1% by mass or more, and more preferably 0.2% by mass or more.

[ASP Value]

The resin particle, the compound represented by the general formula (1) and the surfactant having the HLB value of 15 or less are preferably used while satisfying the following relation with respect to each SP value. The SP value in this specification (δ: solubility parameter) is a value calculated by the Fedors method (unit: $(cal/cm^3)^{1/2}$) using the following formula (B). In order to convert the value to the SI unit system value, the relationship "$(cal/cm^3)^{1/2} = 2.046 \times 10^3\ (J/m^3)^{1/2}$" can be used. In the following description, the unit of the SP value $((cal/cm^3)^{1/2})$ may be omitted.

$$\delta = (\Delta E_{vap}/V)^{1/2} \qquad (B)$$

(In the formula (B), $\Delta E_{vap}$ represents the molar heat of vaporization of the compound (cal/mol), and V represents the molar volume of the compound ($cm^3$/mol) at 25° C.)

(ΔSP Value of Compound Represented by General Formula (1) and Resin Particle)

The difference (ΔSP value) between the SP value of the compound represented by the general formula (1) and the SP value of the resin particle is preferably 5.0 $(cal/cm^3)^{1/2}$ or less. Since the ΔSP value of the compound represented by the general formula (1) and the resin particle is 5.0 or less, the film forming property of the resin particle is easily improved and the effect of improving abrasion resistance of an image is easily obtained. The ΔSP value of the compound represented by the general formula (1) and the resin particle can be obtained by subtracting the SP value of the resin particle from the SP value of the compound represented by the general formula (1). The ΔSP value of the compound represented by the general formula (1) and the resin particle is preferably 1.0 or more, and more preferably 1.5 or more.
(ΔSP Value of Resin Particle and Surfactant having HLB Value of 15 or Less)

The difference (ΔSP value) between the SP value of the resin particle and the SP value of the surfactant having the HLB value of 15 or less is preferably 3.0 $(cal/cm^3)^{1/2}$ or less. Since the ΔSP value of the resin particle and the surfactant having the HLB value of 15 or less is 3.0 or less, the film forming property of the resin particle is easily improved and the effect of improving abrasion resistance of an image is easily obtained. The ΔSP value of the resin particle and the surfactant having the HLB value of 15 or less can be obtained by subtracting the SP value of the surfactant from the SP value of the resin particle. The ΔSP value is preferably 0.5 or more, and more preferably 1.0 or more.
[Mass Ratio of Each Component]

The predetermined components in the aqueous ink and the reaction liquid preferably satisfies the relationship described below.
(Mass Ratio of Resin Particle and Surfactant Having HLB Value of 15 or Less)

The mass ratio of the content (% by mass) of the resin particle in the aqueous ink to the content (% by mass) of the surfactant having the HLB value of 15 or less in the aqueous ink containing the surfactant or in the reaction liquid containing the surfactant is preferably 5.0 times or more to 40.0 times or less. Since the mass ratio is 40.0 times or less, the amount of the surfactant is sufficient for the amount of the resin particle on the recording medium, the film forming property of the resin particle is easily improved, and the effect of improving abrasion resistance of an image is easily obtained. On the other hand, since the mass ratio is 5.0 times or more, the surfactant is unlikely to remain in the resin film or the amount thereof decreases after recording, and the intensity of an image tends to increase, so that the effect of improving abrasion resistance of the image is easily obtained.
(Mass Ratio of Compound Represented by General Formula (1) and Surfactant Having HLB Value of 15 or Less)

The mass ratio of the content (% by mass) of the compound represented by the general formula (1) in the reaction liquid to the content (% by mass) of the surfactant having the HLB value of 15 or less in the aqueous ink containing the surfactant or in the reaction liquid containing the surfactant is preferably 60.0 times or less. Since the mass ratio is 60.0 times or less, the dissolution of the surfactant into the compound represented by the general formula (1) is suppressed, and the surfactant is easily oriented to the interface and the resin particle, so that the effect of improving abrasion resistance of an image is easily obtained. The mass ratio is preferably 10.0 times or more.
(Mass Ratio of Compound Represented by General Formula (1) and Resin Particle)

The mass ratio of the content (% by mass) of the compound represented by the general formula (1) in the reaction liquid to the content (% by mass) of the resin particle in the aqueous ink is preferably 1.0 times or more to 5.0 times or less. Since the mass ratio is 1.0 times or more, the amount of the compound represented by the general formula (1) is sufficient for the amount of the resin particle, and the film forming property of the resin particle is more easily improved, so that the effect of improving abrasion resistance of an image is easily obtained. On the other hand, since the mass ratio is 5.0 times or less, the compound represented by the general formula (1) is unlikely to remain in the resin film or the amount thereof decreases after recording, and the intensity of an image tends to increase, so that the effect of improving abrasion resistance of the image is easily obtained.
[Recording Medium]

The recording medium used in the ink jet recording method and the ink jet recording apparatus of the present invention is not particularly limited, but it is preferable to use a non-absorbing recording medium. The non-absorbing recording medium is the recording medium having a water absorption amount of 10 $mL/m^2$ or less from the start of contact to 30 $msec^{1/2}$ in the Bristow method which is described in "Test Method of Liquid Absorptivity of Paper and Paperboard" of JAPAN TAPPI paper and pulp test method No. 51. In the present invention, the recording medium that satisfies the condition of the water absorption amount described above is defined as the "non-absorbing recording medium". A recording medium for the ink jet recording having an ink-receiving layer formed of an inorganic particle (glossy paper, matte paper and the like) and plain paper having no coating layer are "absorbing recording media" having the water absorption amount exceeding 10 $mL/m^2$. When a recording medium other than the non-absorbing recording medium is used, a liquid component is easily absorbed by the recording medium. On the other hand, when the non-absorbing recording medium is used, absorption of the liquid component is suppressed and the surfactant is easily oriented to the interface and the resin particle, so that abrasion resistance of an image is more easily improved.

Among the non-absorbing recording media, one having a resin layer is preferable. The compound represented by the general formula (1) has an affinity not only with the resin particle contained in the ink but also with a material contained in a general resin layer of the non-absorbing recording medium on which an image is recorded by imparting the aqueous ink of the ink jet system. Therefore, the adhesion between the resin particle and the recording medium is easily enhanced, and abrasion resistance of an image can be further improved.

Any non-absorbing recording medium having a resin layer can be used as long as it satisfies this condition. For example, a plastic film; a recording medium with a plastic film adhered to the recording surface side of the substrate; and a recording medium provided with an organic resin coating layer on the recording surface side of the substrate containing cellulose pulp can be used. Among these, the plastic film is preferable, and the recording medium provided with an organic resin coating layer as an organic resin layer on the recording surface side of the substrate containing cellulose pulp is also preferable. For the organic resin layer such as the plastic film and the organic resin coating layer, for example, an organic resin such as polyvinyl chloride, polyester such as PET, polyethylene, polypropylene and polycarbonate can be used.
[Ejecting Method]

As a method for ejecting the ink or the reaction liquid from the recording head, a method for imparting mechanical energy to the ink or the reaction liquid and a method for imparting thermal energy to the ink or the reaction liquid can be used. Among them, it is preferable to adopt the method in which thermal energy is imparted to the ink or the reaction liquid to eject the ink or the reaction liquid. Examples of the recording head include a recording head ejecting the ink or the reaction liquid by the action of mechanical energy and a recording head ejecting the ink or the reaction liquid by the action of thermal energy. Among them, the recording head ejecting the ink or the reaction liquid by the action of thermal energy is preferable. Although the order in which the ink and the reaction liquid are applied onto the recording medium is not particularly limited, it is preferable to apply the ink after applying the reaction liquid.

[Heating Step]

After the ink and the reaction liquid are applied onto the recording medium, the recording medium is heated to form a film of the resin particle, whereby the strength of an image can be enhanced and the effect of further improving abrasion resistance of the image can be obtained.

A heating unit is not particularly limited, and heating can be carried out by a heating unit such as heating by a heater, blowing warm air by a dryer or the like and a unit combining these. The ink jet recording apparatus may include the heater, the dryer and the combination thereof as the heating unit. Examples of a heating method include a method of imparting heat by a heater or the like from the opposite side (back surface) to the recording surface (ink application surface) of the recording medium, a method of applying warm air or hot air to the recording surface (front surface) of the recording medium and a method of imparting heat by an infrared heater from the recording surface or the back surface. Further, a plurality of these methods may be combined. The heating temperature (temperature of an image) is preferably 60° C. or more to 120° C. or less, and more preferably 70° C. or more to 100° C. or less.

It is preferable that the difference between the heating temperature T(° C.) of the recording medium and the glass transition temperature Tg(° C.) of the resin particle (T-Tg) is −10° C. or more (the heating temperature≥Tg of the resin particle−10° C.), and it is more preferable that the difference is 0° C. or more (that is, the heating temperature is equal to or more than the glass transition temperature (Tg) of the resin particle). Since the difference (T−Tg) is −10° C. or more, the resin particle is easily fused and the effect of improving abrasion resistance of an image is easily obtained. In addition, the difference (T−Tg) between the heating temperature T(° C.) and the glass transition temperature (Tg) is preferably +30° C. or less, and more preferably +20° C. or less.

[Example of Ink Jet Recording Apparatus]

Figure 2:
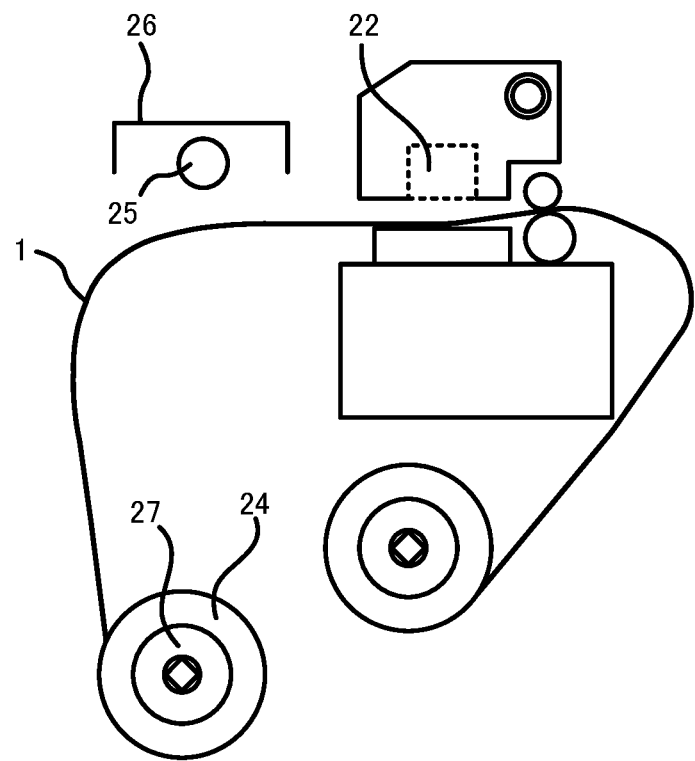
FIG. 2 is a side view for illustrating an example of an ink jet recording apparatus which can be used in the ink jet recording method according to an embodiment of the present invention.

FIG. 1 is a perspective view schematically illustrating one embodiment of an ink jet recording apparatus of the present invention. In addition, FIG. 2 is a side view schematically illustrating one embodiment of an ink jet recording apparatus of the present invention. In the recording apparatus illustrated in FIGS. 1 and 2, a heater 25 supported by a frame (not illustrated) is arranged at a position on the downstream side in the sub-scanning direction A of a position where a recording head 22 reciprocally scans in the main scanning direction B. A recording medium 1 which the reaction liquid and the ink are applied onto can be heated by the heater 25. The heater 25 is covered with a heater cover 26. The heater cover 26 is the part for efficiently irradiating the recording medium 1 with heat generated from the heater 25. Further, the heater cover 26 is also the part for protecting the heater 25. The recording medium 1 which the ink ejected from the recording head 22 is applied onto is taken up by a take-up spool 27 to form a rolled taken-up medium 24.

EXAMPLES

The present invention is described in more detail with reference to Examples and Comparative Examples below, but the present invention is not limited in any way by the following examples as long as the gist thereof is not exceeded. "Part" and "%" described with respect to the amount of components are on a mass basis unless otherwise indicated.

<Preparation of Pigment Dispersion Liquid>

A styrene/acrylic acid copolymer (the composition (mol) ratio=84.6/15.4, the acid value 120 mg KOH/g), which is a water-soluble resin, was dissolved in ion-exchanged water using sodium hydroxide at the molar amount equal to the acid value to prepare an aqueous solution of a resin-dispersant having the resin content of 20.0%. The mixture of 30.0 parts of the pigment (carbon black), 30.0 parts of the aqueous solution of the resin-dispersant and 40.0 parts of water was put into a sand grinder and subjected to the dispersion treatment for one hour. Then, after a coarse particle was removed by centrifugation, pressure filtration was performed with a microfilter having a pore size of 3.0 m (manufactured by Fujifilm Corporation), and an appropriate amount of ion-exchanged water was added to obtain a pigment dispersion liquid. The pigment content in the pigment dispersion liquid was 30.0%, and the resin content was 6.0%.

<Physical Property of Resin Particle>

An aqueous dispersion liquid of the resin particle was dried and solidified at 60° C. to obtain a solid resin particle. The obtained resin particle 2 mg was put in an aluminum container and sealed to prepare a sample for the measurement. The prepared sample was thermally analyzed using a differential scanning calorimeter (product name "Q1000", manufactured by TA Instruments Corporation), according to the temperature program described below to prepare a temperature rising curve. In the prepared temperature rising curve (horizontal axis: temperature, vertical axis: heat quantity), the temperature at the intersection point of the straight line extending to the high temperature side through two points in the curve on the low temperature side and the tangent line drawn at the point where the slope of the step-like changing part in the curve becomes maximum is defined as the "glass transition temperature (Tg) of the resin (particle)".

[Temperature Program]:
 (1) Raising temperature to 200° C. at 10° C./min
 (2) Decreasing temperature from 200° C. to −50° C. at 5° C./min
 (3) Raising temperature from −50° C. to 200° C. at 10° C./min The amount of the anionic group in the resin particle was determined by colloidal titration. The amount of the anionic group of the resin particle (mol/g) was measured by colloidal titration using the potential difference, using a potential difference automatic titrator (product name "AT-510", manufactured by Kyoto Electronics Manufacturing Co., Ltd.) equipped with a flow potential titration unit (PCD-500). As a titration reagent, methyl glycol chitosan was used. Further, the SP value of the resin particle ($(cal/cm^3)^{1/2}$) was calculated from the SP value and the mass ratio of the unit composing the resin.

<Synthesis of Resin Particle>
(Resin Particle 1)

About 1160 mL of water was heated to 90° C. in the reactor. Further, 1.39 g of potassium persulfate as the polymerization initiator was mixed with 160 mL of water to prepare a solution. First, 32 mL of the initiator solution was added to the reactor and stirred. Separately, 183 g of styrene, 80 g of benzyl acrylate, 1.5 g of methacrylic acid, 1.6 g of isooctyl thioglycolate as the chain transfer agent and 9.98 g of a 30% aqueous emulsifier solution were mixed in 159.4 mL of water to prepare a monomer mixed liquid. As the emulsifier, "Rhodafac RS 710" (manufactured by Rhodia Novecare Corporation) was used. The monomer mixed liquid was added dropwise to the reactor over 30 minutes, and at the same time, 129.4 g of the initiator solution was added dropwise to the reactor over the same period of time and stirred. The obtained reaction product was stirred and maintained at 90° C. for three hours. The reaction product was then cooled to 50° C. Thereafter, potassium hydroxide was added to adjust the pH of the solution to 8.5. After the solution was cooled to 25° C., the solution was filtered using a 200 mesh filter, and an appropriate amount of deionized water was added to adjust the resin particle content to 30.0%. Thus, an aqueous dispersion liquid of the resin particle 1 which is formed of an acrylic resin was obtained. The amount of the anionic group of the resin particle 1 was 71 mol/g, the Tg was 67° C., and the SP value was 10.8.

(Resin Particle 2)

A separable flask with a volume of 1 L equipped with a stirrer, a thermometer and a reflux tube was prepared. A mixture of 100 g of polycarbonate diol, 4.2 g of 2,2-bis (hydroxymethyl) propionic acid, 41 g of 4,4'-dicyclohexyl-methane diisocyanate, 2.2 g of triethylamine and 80 g of acetone (solvent) was prepared. As the polycarbonate diol, "T-5650E", manufactured by Asahi Kasei was used. After the mixture was put in the flask under a nitrogen atmosphere, one drop of a catalyst (di(2-ethylhexanoate) tin (II)) was added and reacted at 80° C. for 15 hours. After the mixture was cooled to 40° C., water was added to the flask while the mixture was stirred at a rotation speed of 300 rpm to form a particle of a urethane resin. After the mixture was stirred at 40° C. for 30 minutes, 1.2 g of diethylenetriamine was added and the mixture was stirred at 40° C. for six hours. After the solvent was distilled off, deionized water was added to adjust the resin content to 30.0%. Thus, an aqueous dispersion liquid of the resin particle 2 which is formed of the urethane resin was obtained. The amount of the anionic group of the resin particle 2 was 125 mol/g, the Tg was 64° C., and the SP value was 11.5.

(Resin Particles 3 to 9)

A mixture of the components (unit: part) shown in the item "Esterification reaction" of Table 1 was put into the reaction vessel installed in an autoclave, and the mixture was heated at 220° C. for four hours to perform the esterification reaction. The abbreviations of the components in Table 1 represent the following. EG: ethylene glycol, NPG: neopentyl glycol, BPA: bisphenol A, tPA: terephthalic acid, iPA: isophthalic acid and BTA: trimellitic acid. Then, the temperature was raised to 240° C., and the pressure in the autoclave was reduced to 13 Pa over 90 minutes. After the esterification (dehydration condensation) reaction was continued at 240° C. in the reduced pressure state of 13 Pa for five hours, nitrogen gas was introduced into the autoclave to return the pressure to normal pressure. After the temperature in the reaction vessel was lowered to 220° C., a catalyst (tetra-n-butyltitanate) and the component (unit: part) shown in the item of "Transesterification" in Table 1 were added and the reaction product was heated at 220° C. for two hours to perform the transesterification. The amount of the catalyst used (mol) was $3 \times 10^{-4} \times$ the total amount of polycarboxylic acid used (mol). Thereafter, nitrogen gas was introduced into the autoclave to bring the pressure into a pressurized state, and the sheet-like resin was taken out. The resin was cooled to 25° C. and then crushed with a crusher to obtain a resin.

A stirrer (product name "Tornado Stirrer Standard SM-104", manufactured by As One Corporation) was set in a beaker with a volume of 2 L. In this beaker, 210 g of the resin obtained above and methyl ethyl ketone were put and stirred at 30° C. to dissolve the resins. Then, 5% aqueous potassium hydroxide solution at an amount equivalent to a neutralization rate (mol %) based on the acid value corresponding to the acid group of the resin was added and stirred for 30 minutes. While stirring at 30° C., 500 g of deionized water was added dropwise at a rate of 20 mL/min. After the temperature was raised to 60° C., methyl ethyl ketone was distilled and a part of the water was also distilled. After the mixture was cooled to 25° C., the mixture was filtered through a wire mesh of 150 mesh, and the obtained resin was formed to a 30.0% aqueous resin solution using deionized water. Thus, aqueous dispersion liquids of the resin particles 3 to 9 which are formed of the polyester resin were obtained. The characteristics of the resin particles 3 to 9 are shown in the item of "Characteristics" in Table 1.

TABLE 1

Synthesis conditions and characteristics of resin particles 3 to 9

| | Synthesis conditions (uint: part) | | | | | | | | | Characteristics | | |
|---|---|---|---|---|---|---|---|---|---|---|---|---|
| | Esterification reaction | | | | | | Trans-esterification | Total amount used | | Anionic | | |
| Resin particle | NPG | EG | BPA | tPA | iPA | BTA | BTA | Polyhydric alcohol | Polycarboxylic acid | group (μmol/g) | Tg (° C.) | SP value |
| 3 | 90.00 | | 10.00 | 50.00 | 50.00 | 7.60 | 2.40 | 100.00 | 110.00 | 125 | 64 | 11.5 |
| 4 | | 90.00 | 6.00 | 50.00 | 50.00 | 7.60 | 2.40 | 96.00 | 110.00 | 125 | 86 | 12.6 |
| 5 | | 90.00 | 2.00 | 50.00 | 50.00 | 7.60 | 2.40 | 92.00 | 110.00 | 125 | 87 | 12.7 |
| 6 | 95.00 | | 10.00 | 50.00 | 50.00 | 7.60 | 2.40 | 105.00 | 110.00 | 125 | 62 | 11.4 |
| 7 | 100.00 | | 10.00 | 50.00 | 50.00 | 7.60 | 2.40 | 110.00 | 110.00 | 125 | 59 | 11.3 |
| 8 | 90.00 | | 10.00 | 50.00 | 50.00 | 6.27 | 3.74 | 100.00 | 110.00 | 350 | 64 | 11.5 |
| 9 | 90.00 | | 10.00 | 50.00 | 50.00 | 6.26 | 3.74 | 100.00 | 110.00 | 352 | 64 | 11.5 |

<SP Value of Water-Soluble Organic Solvent>

The SP values of the water-soluble organic solvents used in the preparation of the ink and the reaction liquid are shown below.

N-(2-Hydroxyethyl)-2-pyrrolidone: 14.3
N-Hydroxymethyl-2-pyrrolidone: 15.2
N-(3-Hydroxypropyl)-2-pyrrolidone: 13.7
N-Hydroxy-2-pyrrolidone: 16.4
N-(4-Hydroxybutyl)-2-pyrrolidone: 13.2
2-Pyrrolidone: 12.6
N-Methyl-2-pyrrolidone: 11.5
3-Methoxy-N,N-dimethylpropionamide: 9.2
γ-Butyrolactone: 9.9
1,2-Butanediol: 12.8

<Surfactant>

Commercial surfactants having the following trade names were used for the preparation of the ink and the reaction liquid described below.

NIKKOL BC-20 (manufactured by Nikko Chemicals Co., Ltd.): the HLB value 16, the SP value 9.4

Among the above surfactants, "Zonyl FS-3100" is a fluorine surfactant, "Acetylenol E60" is an ethylene oxide adduct of acetylene glycol, and the other surfactants are polyoxyethylene alkyl ethers.

<Preparation of Ink>

After the components (unit: %) shown in the upper part of Table 2 were mixed and sufficiently stirred, the mixture was pressure-filtrated through a cellulose acetate filter having a pore size of 1.2 m (product name "Minisart", manufactured by Sartorius Corporation) to prepare each ink. "Proxel GXL (S)" (product name; manufactured by Arch Chemicals Corporation) in Table 2 refers to a commercially available antiseptic, which was also used to prepare the reaction liquid described later.

TABLE 2

| | Ink | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Pigment dispersion liquid | 20.0 | | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Aqueous dispersion liquid of resin particle 1 | 26.7 | 26.7 | | | 26.7 | 26.7 | 15.0 | 16.8 | | | | | | | 26.7 | | 26.7 |
| Aqueous dispersion liquid of resin particle 2 | | | 26.7 | | | | | | | | | | | | | | |
| Aqueous dispersion liquid of resin particle 3 | | | | 26.7 | | | | | | | | | | | | | |
| Aqueous dispersion liquid of resin particle 4 | | | | | | | | | 26.7 | | | | | | | | |
| Aqueous dispersion liquid of resin particle 5 | | | | | | | | | | 26.7 | | | | | | | |
| Aqueous dispersion liquid of resin particle 6 | | | | | | | | | | | 26.7 | | | | | | |
| Aqueous dispersion liquid of resin particle 7 | | | | | | | | | | | | 26.7 | | | | | |
| Aqueous dispersion liquid of resin particle 8 | | | | | | | | | | | | | 26.7 | | | | |
| Aqueous dispersion liquid of resin particle 9 | | | | | | | | | | | | | | 26.7 | | | |
| 1,2-Butanediol | 20.0 | 20.0 | 20.0 | 20.0 | 20.0 | 20.0 | 20.0 | 20.0 | 20.0 | 20.0 | 20.0 | 20.0 | 20.0 | 20.0 | 16.3 | 20.0 | 20.0 |
| N-(2-Hydroxyethyl)-2-pyrrolidone | | | | | | | | | | | | | | | 3.8 | | |
| NIKKOL BL-4.2 | | | | | 0.5 | | | | | | | | | | | | |
| TERGITOL 15-S-7 | | | | | | 0.5 | | | | | | | | | | | |
| NIKKOL BC-20 | | | | | | | | | | | | | | | | | 0.5 |
| Proxel GXL (S) | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 33.1 | 53.1 | 33.1 | 33.1 | 32.6 | 32.6 | 44.8 | 43.0 | 33.1 | 33.1 | 33.1 | 33.1 | 33.1 | 33.1 | 33.1 | 59.8 | 32.6 |
| Resin particle content $R_f$(%) | 8.0 | 8.0 | 8.0 | 8.0 | 8.0 | 8.0 | 4.5 | 5.0 | 8.0 | 8.0 | 8.0 | 8.0 | 8.0 | 8.0 | 8.0 | 0.0 | 8.0 |
| Content of surfactant having HLB value of 15 or less $SO_f$(%) | 0.0 | 0.0 | 0.0 | 0.0 | 0.5 | 0.5 | 0.0 | 0.0 | 0.0 | 0.0 | 0.0 | 0.0 | 0.0 | 0.0 | 0.0 | 0.0 | 0.0 |

NIKKOL BL-4.2 (manufactured by Nikko Chemicals Co., Ltd.): the HLB value 10, the SP value 9.6
EMALEX 1615 (manufactured by Nihon Emulsion Co., Ltd.): the HLB value 15, the SP value 9.4
TERGITOL 15-5-7 (manufactured by Dow Chemical Corporation): the HLB value 11, the SP value 9.4
TERGITOL 15-5-9 (manufactured by Dow Chemical Corporation): the HLB value 12, the SP value 9.4
NIKKOL BC-10 (manufactured by Nikko Chemicals Co., Ltd.): the HLB value 13, the SP value 9.4
Zonyl FS-3100 (manufactured by Chemours Corporation): the HLB value 10, the SP value 8.7
Acetylenol E60 (manufactured by Kawaken Fine Chemicals Co., Ltd.): the HLB value 11, the SP value 9.9

<Preparation of Reaction Liquid>

After the components (unit: %) shown in the upper part of Table 3 were mixed, sufficiently stirred and pressure-filtrated through a cellulose acetate filter having a pore size of 1.2 μm (product name "Minisart", manufactured by Sartorius Corporation) to prepare each reaction liquid. "PDT-2" in Table 3 is the product name of an aqueous solution of dimethylamine-epichlorohydrin condensate (a pure content of 60%) manufactured by Yokkaichi Chemical Company Limited. Further, "PAS-92" is the product name of an aqueous solution of diallylamine hydrochloride-sulfur dioxide copolymer (a pure content of 20%) manufactured by Nittobo Medical Co., Ltd.

TABLE 3

Compositions and characteristics of reaction liquid

Reaction liquid (columns 1–20)

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Succinic acid (pKa4.0) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Glutaric acid (pKa4.3) | | | | | | | | | | | | | | | | | | | | |
| Dichloroacetic Acid (pKa1.5) | | | | | | | | | | | | | | | | | | | | |
| Maleic acid (pKa1.8) | | | | | | | | | | | | | | | | | | | | |
| Lactic acid (pKa3.9) | | | | | | | | | | | | | | | | | | | | |
| PDT-2 | | | | | | | | | | | | | | | | | | | | |
| PAS-92 | | | | | | | | | | | | | | | | | | | | |
| Calcium nitrate | | | | | | | | | | | | | | | | | | | | |
| Calcium chloride | | | | | | | | | | | | | | | | | | | | |
| N-(2-Hydroxyethyl)-2-pyrrolidone | 15.0 | | | | 15.0 | 15.0 | 15.0 | 10.0 | 10.0 | 30.0 | 30.5 | 7.0 | 8.0 | 25.0 | 26.0 | 15.0 | 15.0 | 15.0 | 15.0 | 15.0 |
| N-Hydroxymethyl-2-pyrrolidone | | 15.0 | | | | | | | | | | | | | | | | | | |
| N-(3-Hydroxypropyl)-2-pyrrolidone | | | 15.0 | | | | | | | | | | | | | | | | | |
| N-Hydroxy-2-pyrrolidone | | | | 15.0 | | | | | | | | | | | | | | | | |
| N-(4-Hydroxybutyl)-2-pyrrolidone | | | | | | | | | | | | | | | | | | | | |
| 2-Pyrrolidone | | | | | | | | | | | | | | | | | | | | |
| N-Methyl-2-pyrrolidone | | | | | | | | | | | | | | | | | | | | |
| 3-Methoxy-N,N-dimethylpropionamide | | | | | | | | | | | | | | | | | | | | |
| γ-Butyrolactone | | | | | | | | | | | | | | | | | | | | |
| 1,2-Butanediol | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| NIKKOL BL-4.2 | 0.5 | 0.5 | 0.5 | | | 1.0 | 0.9 | 0.20 | 0.18 | 0.5 | 0.5 | 0.5 | 0.5 | 0.5 | 0.5 | 1.0 | 1.1 | | | |
| EMALEX 1615 | | | | | 0.5 | | | | | | | | | | | | | | | |
| TERGITOL 15-S-7 | | | | | | | | | | | | | | | | | | 0.5 | | |
| TERGITOL 15-S-9 | | | | | | | | | | | | | | | | | | | 0.5 | |
| NIKKOL BC-10 | | | | | | | | | | | | | | | | | | | | 0.5 |
| Zonyl FS-3100 | | | | | | | | | | | | | | | | | | | | |
| Acetylenol E60 | | | | | | | | | | | | | | | | | | | | |
| NIKKOL BC-20 | | | | | | | | | | | | | | | | | | | | |
| Proxel GXL (S) | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 77.3 | 77.3 | 77.3 | 77.8 | 77.3 | 76.8 | 76.9 | 82.60 | 82.62 | 62.3 | 61.8 | 85.3 | 84.3 | 67.3 | 66.3 | 6.8 | 76.7 | 77.3 | 77.3 | 77.3 |
| Content of compound represented by general formula (1) $L_R$ (%) | 15.0 | 15.0 | 15.0 | 0.0 | 15.0 | 15.0 | 15.0 | 10.0 | 10.0 | 30.0 | 30.5 | 7.0 | 8.0 | 25.0 | 26.0 | 15.0 | 15.0 | 15.0 | 15.0 | 15.0 |
| Content of surfactant having HLB value of 15 or less $S_R$ (%) | 0.5 | 0.5 | 0.5 | 0.0 | 0.5 | 1.0 | 0.9 | 0.20 | 0.18 | 0.5 | 0.5 | 0.5 | 0.5 | 0.5 | 0.5 | 1.0 | 1.1 | 0.5 | 0.5 | 0.5 |

Reaction liquid (columns 21–39)

| | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| Succinic acid (pKa4.0) | 2.0 | 2.0 | 2.0 | | | | | | | | | 2.0 | 2.0 | 2.0 | 2.0 | 2.0 | 2.0 | 2.0 | 2.0 |
| Glutaric acid (pKa4.3) | | | | 2.0 | | | | | | | | | | | | | | | |
| Dichloroacetic Acid (pKa1.5) | | | | | 2.0 | | | | | | | | | | | | | | |
| Maleic acid (pKa1.8) | | | | | | 2.0 | | | | | | | | | | | | | |
| Lactic acid (pKa3.9) | | | | | | | 2.0 | | | | | | | | | | | | |
| PDT-2 | | | | | | | | 2.0 | | | | | | | | | | | |
| PAS-92 | | | | | | | | | 2.0 | | | | | | | | | | |
| Calcium nitrate | | | | | | | | | | 2.0 | | | | | | | | | |
| Calcium chloride | | | | | | | | | | | 2.0 | | | | | | | | |

TABLE 3-continued

Compositions and characteristics of reaction liquid

Reaction liquid

| Component | | | | | | | | | | | | | |
|---|---|---|---|---|---|---|---|---|---|---|---|---|---|
| N-(2-Hydroxyethyl)-2-pyrrolidone | 15.0 | 15.0 | | | | | | | | | | | |
| N-Hydroxymethyl-2-pyrrolidone | | | | | | | | | | | | | |
| N-(3-Hydroxypropyl)-2-pyrrolidone | | | 15.0 | | | | | | | | | | |
| N-Hydroxy-2-pyrrolidone | | | | 15.0 | | | | | | | | | |
| N-(4-Hydroxybutyl)-2-pyrrolidone | | | | | 15.0 | | | | | | | | |
| 2-Pyrrolidone | | | | | | 15.0 | | | | | | | |
| N-Methyl-2-pyrrolidone | | | | | | | 15.0 | | | | | | |
| 3-Methoxy-N,N-dimethylpropionamide | | | | | | | | | | | | 15.0 | |
| γ-Butyrolactone | | | | | | | | | | | | | 15.0 |
| 1,2-Butanediol | 5.0 | | | | | | | | | | | | 5.0 |
| NIKKOL BL-4.2 | | | | | | | | | 20.0 | | | | |
| EMALEX 1615 | | | | | | | | | | | | | |
| TERGITOL 15-S-7 | | | | | | | | | | | | | |
| TERGITOL 15-S-9 | | | | | | | | | | | | | |
| NIKKOL BC-10 | | | | | | | | | | | | | |
| Zonyl FS-3100 | | | | | | | | | | | | 0.5 | |
| Acetylenol E60 | 0.5 | | | | | | | | | | | | |
| NIKKOL BC-20 | | | | | | | | | | | | | |
| Proxel GXL (S) | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 77.3 | 77.3 | 77.3 | 77.3 | 77.3 | 77.3 | 77.3 | 92.3 | 77.3 | 77.3 | 77.3 | 77.3 | 77.3 |
| Content of compound represented by general formula (1) $L_R$ (%) | 15.0 | 15.0 | 15.0 | 15.0 | 15.0 | 15.0 | 15.0 | 0.0 | 0.0 | 0.0 | 0.0 | 15.0 | 0.0 |
| Content of surfactant having HLB value of 15 or less $S_R$ (%) | 0.5 | 0.5 | 0.5 | 0.5 | 0.5 | 0.5 | 0.5 | 0.5 | 0.5 | 0.5 | 0.5 | 0.5 | 0.5 |

<Evaluation>

The following recording media were used for recording an image. The "amount of water absorbed" indicates the amount of water absorbed from the start of contact to 30 msec$^{1/2}$ in the Bristow method.

Recording medium 1 (product name "Scotchcal Graphic Film IJ1220", manufactured by 3M Corporation, the material: polyvinyl chloride, the amount of water absorbed: 10 mL/m² or less)

Recording medium 2 (product name "Canon Photo Paper-Glossy Pro [Platinum Grade] PT-201", manufactured by Canon Corporation, with no resin layer, the amount of water absorbed: more than 10 mL/m²)

Recording medium 3 (product name "LX Gloss Coat157 LXGC54", manufactured by Sakurai Co., Ltd., with no resin layer, the amount of water absorbed: 10 mL/m² or less)

The following evaluation was carried out using an ink jet recording apparatus (product name "imagePROGRAF PRO-2000", manufactured by Canon Corporation) in which an infrared heater for heating was incorporated at a position facing a recording medium on the downstream side of the recording head in the conveying direction of the recording medium. In the above ink jet recording apparatus, the image recorded under the condition that one drop of 4 ng of the ink is applied onto a unit area of 1/1200 inch×1/1200 inch is defined as having a recording duty of 100%. Each of the inks prepared above was filled into an ink cartridge respectively. Recording was carried out under the condition that the temperature was 25° C. and the relative humidity was 50%. Using the above-described recording apparatus, the reaction liquid (recording duty of 30%) and the ink (recording duty of 120%) were applied in this order in layer onto the recording medium in a combination of the reaction liquid, the ink and the recording medium shown in Table 4. Thereafter, the area of the recording medium which the reaction liquid and the ink were applied onto was heated by an infrared heater so that the temperature of the image became the temperature shown in Table 4, and a solid image was recorded.

The abbreviations in Table 4 indicate the following.

$R_I$: Content of Resin particle in ink (%)
$S_I$: Content of surfactant having HLB value of 15 or less in ink (%)
$L_R$: Content of compound represented by general formula (1) in reaction liquid (%)
$S_R$: Content of surfactant having HLB value of 15 or less in reaction liquid (%)
S: $S_I$ or $S_R$, that is, content of surfactant in ink or in reaction liquid (%)

The item of "mass ratio" shown in Table 4 indicates the mass ratio of each component. Further, the item of "ΔSP value" shown in Table 4 indicates the difference in the SP values of the components. "Resin particle-surfactant" in this item indicates the difference obtained by subtracting the SP value of the surfactant from the SP value of the resin particle, and "general formula (1)-resin particle" indicates the difference obtained by subtracting the SP value of the resin particle from the SP value of the compound represented by the general formula (1).

(Abrasion Resistance)

The recorded image of the obtained recorded article was subjected to the abrasion test reciprocally for 20 times at a load of 500 g using a wear resistance testing machine (manufactured by Tester Sangyo Co., Ltd.) which is a Gakushin type testing machine according to JIS L0849 and a white cloth (cotton) for abrasion specified by JIS L0803. The image after the abrasion test was visually checked and the abrasion resistance of the image was evaluated according to the following evaluation criteria. In the present invention, "A+", "A" and "B" are acceptable and "C" is unacceptable based on the following evaluation criteria. The evaluation results are shown in Table 4.

A+: No scratch mark on image after 10 times abrasion tests
A: Scratch mark on image after 10 times abrasion tests, but no scratch mark after 5 times abrasion tests
B: Scratch mark on image, but no white background of recording medium revealed after 5 times abrasion tests
C: Scratch mark on image, and white background of recording medium revealed after 5 times abrasion tests

TABLE 4

Evaluation conditions and evaluation results

| | | Reaction liquid | Ink | Recording medium | Mass Ratio | | | ΔSP value | | Heating treatment | Heating temperature (° C.) | Abrasion resistance |
|---|---|---|---|---|---|---|---|---|---|---|---|---|
| | | | | | $R_I/S$ | $L_R/S$ | $L_R/R_I$ | Resin particle-surfactant | General formula (1)-resin particle | | | |
| Examples | 1 | 1 | 1 | 1 | 16.0 | 30.0 | 1.9 | 1.2 | 2.7 | Yes | 80 | A |
| | 2 | 2 | 1 | 1 | 16.0 | 30.0 | 1.9 | 1.2 | 3.4 | Yes | 80 | A |
| | 3 | 3 | 1 | 1 | 16.0 | 30.0 | 1.9 | 1.2 | 2.1 | Yes | 80 | A |
| | 4 | 1 | 2 | 1 | 16.0 | 30.0 | 1.9 | 1.2 | 2.7 | Yes | 80 | A |
| | 5 | 1 | 3 | 1 | 16.0 | 30.0 | 1.9 | 1.9 | 2.0 | Yes | 80 | A |
| | 6 | 1 | 4 | 1 | 16.0 | 30.0 | 1.9 | 1.9 | 2.0 | Yes | 80 | A |
| | 7 | 4 | 5 | 1 | 16.0 | 30.0 | 1.9 | 1.2 | 2.7 | Yes | 80 | A |
| | 8 | 4 | 6 | 1 | 16.0 | 30.0 | 1.9 | 1.4 | 2.7 | Yes | 80 | A |
| | 9 | 5 | 1 | 1 | 16.0 | 30.0 | 1.9 | 1.4 | 2.7 | Yes | 80 | B |
| | 10 | 6 | 7 | 1 | 4.5 | 15.0 | 3.3 | 1.2 | 2.7 | Yes | 80 | B |
| | 11 | 7 | 7 | 1 | 5.0 | 16.7 | 3.3 | 1.2 | 2.7 | Yes | 80 | A |
| | 12 | 8 | 1 | 1 | 40.0 | 50.0 | 1.3 | 1.2 | 2.7 | Yes | 80 | A |
| | 13 | 9 | 1 | 1 | 44.4 | 55.6 | 1.3 | 1.2 | 2.7 | Yes | 80 | B |
| | 14 | 10 | 1 | 1 | 16.0 | 60.0 | 3.8 | 1.2 | 2.7 | Yes | 80 | A |
| | 15 | 11 | 1 | 1 | 16.0 | 61.0 | 3.8 | 1.2 | 2.7 | Yes | 80 | B |
| | 16 | 12 | 1 | 1 | 16.0 | 14.0 | 0.9 | 1.2 | 2.7 | Yes | 80 | B |
| | 17 | 13 | 1 | 1 | 16.0 | 16.0 | 1.0 | 1.2 | 2.7 | Yes | 80 | A |
| | 18 | 14 | 8 | 1 | 10.0 | 50.0 | 5.0 | 1.2 | 2.7 | Yes | 80 | A |
| | 19 | 15 | 8 | 1 | 10.0 | 52.0 | 5.2 | 1.2 | 2.7 | Yes | 80 | B |

TABLE 4-continued

Evaluation conditions and evaluation results

| | | Reaction liquid | Ink | Recording medium | Mass Ratio $R_I/S$ | Mass Ratio $L_R/S$ | Mass Ratio $L_R/R_I$ | ΔSP value Resin particle-surfactant | ΔSP value General formula (1)-resin particle | Heating treatment | Heating temperature (° C.) | Abrasion resistance |
|---|---|---|---|---|---|---|---|---|---|---|---|---|
| | 20 | 16 | 1 | 1 | 8.0 | 15.0 | 1.9 | 1.2 | 2.7 | Yes | 80 | A |
| | 21 | 17 | 1 | 1 | 7.3 | 13.6 | 1.9 | 1.2 | 2.7 | Yes | 80 | B |
| | 22 | 18 | 1 | 1 | 16.0 | 30.0 | 1.9 | 1.4 | 2.7 | Yes | 80 | A |
| | 23 | 19 | 1 | 1 | 16.0 | 30.0 | 1.9 | 1.4 | 2.7 | Yes | 80 | A |
| | 24 | 20 | 1 | 1 | 16.0 | 30.0 | 1.9 | 1.4 | 2.7 | Yes | 80 | B |
| | 25 | 21 | 1 | 1 | 16.0 | 30.0 | 1.9 | 2.1 | 2.7 | Yes | 80 | B |
| | 26 | 22 | 1 | 1 | 16.0 | 30.0 | 1.9 | 0.9 | 2.7 | Yes | 80 | B |
| | 27 | 1 | 9 | 1 | 16.0 | 30.0 | 1.9 | 3.0 | 0.9 | Yes | 80 | A |
| | 28 | 1 | 10 | 1 | 16.0 | 30.0 | 1.9 | 3.1 | 0.8 | Yes | 80 | B |
| | 29 | 23 | 11 | 1 | 16.0 | 30.0 | 1.9 | 1.8 | 5.0 | Yes | 80 | A |
| | 30 | 23 | 12 | 1 | 16.0 | 30.0 | 1.9 | 1.7 | 5.1 | Yes | 80 | B |
| | 31 | 23 | 1 | 1 | 16.0 | 30.0 | 1.9 | 1.2 | 5.6 | Yes | 80 | B |
| | 32 | 1 | 13 | 1 | 16.0 | 30.0 | 1.9 | 1.9 | 2.0 | Yes | 80 | A |
| | 33 | 1 | 14 | 1 | 16.0 | 30.0 | 1.9 | 1.9 | 2.0 | Yes | 80 | B |
| | 34 | 1 | 15 | 1 | 16.0 | 30.0 | 1.9 | 1.2 | 2.7 | Yes | 80 | A+ |
| | 35 | 24 | 1 | 1 | 16.0 | 30.0 | 1.9 | 1.2 | 2.7 | Yes | 80 | A |
| | 36 | 25 | 1 | 1 | 16.0 | 30.0 | 1.9 | 1.2 | 2.7 | Yes | 80 | B |
| | 37 | 26 | 1 | 1 | 16.0 | 30.0 | 1.9 | 1.2 | 2.7 | Yes | 80 | A |
| | 38 | 27 | 1 | 1 | 16.0 | 30.0 | 1.9 | 1.2 | 2.7 | Yes | 80 | B |
| | 39 | 28 | 1 | 1 | 16.0 | 30.0 | 1.9 | 1.2 | 2.7 | Yes | 80 | B |
| | 40 | 29 | 1 | 1 | 16.0 | 30.0 | 1.9 | 1.2 | 2.7 | Yes | 80 | B |
| | 41 | 30 | 1 | 1 | 16.0 | 30.0 | 1.9 | 1.2 | 2.7 | Yes | 80 | B |
| | 42 | 31 | 1 | 1 | 16.0 | 30.0 | 1.9 | 1.2 | 2.7 | Yes | 80 | B |
| | 43 | 1 | 1 | 2 | 16.0 | 30.0 | 1.9 | 1.2 | 2.7 | Yes | 80 | B |
| | 44 | 1 | 1 | 3 | 16.0 | 30.0 | 1.9 | 1.2 | 2.7 | Yes | 80 | B |
| | 45 | 1 | 1 | 1 | 16.0 | 30.0 | 1.9 | 1.2 | 2.7 | No | — | B |
| | 46 | 1 | 1 | 1 | 16.0 | 30.0 | 1.9 | 1.2 | 2.7 | Yes | 56 | B |
| | 47 | 1 | 1 | 1 | 16.0 | 30.0 | 1.9 | 1.2 | 2.7 | Yes | 57 | A |
| Comparative Examples | 1 | 1 | 16 | 1 | 0.0 | 30.0 | — | — | — | Yes | 80 | C |
| | 2 | 32 | 1 | 1 | 16.0 | 0.0 | 0.0 | 1.2 | — | Yes | 80 | C |
| | 3 | 33 | 15 | 1 | 16.0 | 0.0 | 0.0 | 1.2 | — | Yes | 80 | C |
| | 4 | 34 | 1 | 1 | 16.0 | 0.0 | 0.0 | 1.2 | — | Yes | 80 | C |
| | 5 | 35 | 1 | 1 | 16.0 | 0.0 | 0.0 | 1.2 | — | Yes | 80 | C |
| | 6 | 36 | 1 | 1 | 16.0 | 0.0 | 0.0 | 1.2 | — | Yes | 80 | C |
| | 7 | 4 | 1 | 1 | — | — | 1.9 | — | 2.7 | Yes | 80 | C |
| | 8 | 37 | 1 | 1 | — | — | 1.9 | 1.4 | 2.7 | Yes | 80 | C |
| | 9 | 4 | 17 | 1 | — | — | 1.9 | 1.4 | 2.7 | Yes | 80 | C |
| | 10 | 38 | 1 | 1 | 16.0 | 0.0 | 0.0 | 1.4 | — | Yes | 80 | C |
| | 11 | 39 | 1 | 1 | 16.0 | 0.0 | 0.0 | 1.4 | — | Yes | 80 | C |

According to the present invention, it is possible to provide the ink jet recording method capable of recording an image having good abrasion resistance by using the aqueous ink and the reaction liquid. Further, according to the present invention, the ink jet recording apparatus which can be used in the ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-134119, filed Aug. 19, 2021, Japanese Patent Application No. 2021-134120, filed Aug. 19, 2021, Japanese Patent Application No. 2021-134121, filed Aug. 19, 2021, and Japanese Patent Application No. 2022-118745, filed Jul. 26, 2022, which are hereby incorporated by reference herein in their entirety.

What is claimed is:

1. An ink jet recording method in which an aqueous ink comprising a resin particle and a reaction liquid comprising a reactant for aggregating a component in the aqueous ink are ejected from a recording head of an ink jet system and applied onto a recording medium,
wherein the reaction liquid comprises a compound represented by the following general formula (1),
at least one of the aqueous ink and the reaction liquid comprises a surfactant having an HLB value of 15 or less:

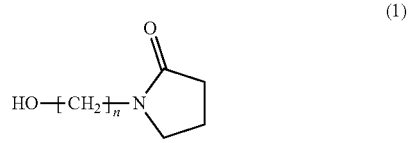

(1)

wherein, in the general formula (1), n represents an integer of 0 to 3, and
wherein the resin particle in the aqueous ink first contacts the compound represented by the general formula (1) in the reaction liquid on the recording medium.

2. The ink jet recording method according to claim 1, wherein a mass ratio of the content (% by mass) of the resin particle in the aqueous ink to the content (% by mass) of the surfactant in the aqueous ink containing the surfactant or in the reaction liquid containing the surfactant is 5.0 times or more to 40.0 times or less.

3. The ink jet recording method according to claim 1, wherein a mass ratio of the content (% by mass) of the compound represented by the general formula (1) in the reaction liquid to the content (% by mass) of the surfactant in the aqueous ink containing the surfactant or in the reaction liquid containing the surfactant is 60.0 times or less.

4. The ink jet recording method according to claim 1, wherein a mass ratio of the content (% by mass) of the compound represented by the general formula (1) in the reaction liquid to the content (% by mass) of the resin particle in the aqueous ink is 1.0 times or more to 5.0 times or less.

5. The ink jet recording method according to claim 1, wherein the content (% by mass) of the surfactant based on the total mass of the aqueous ink containing the surfactant or the reaction liquid containing the surfactant is 1.0% by mass or less.

6. The ink jet recording method according to claim 1, wherein the HLB value of the surfactant is 12 or less.

7. The ink jet recording method according to claim 1, wherein the surfactant comprises a polyoxyethylene alkyl ether.

8. The ink jet recording method according to claim 1, wherein a difference between an SP value of the resin particle and an SP value of the surfactant is 3.0 $(cal/cm^3)^{1/2}$ or less.

9. The ink jet recording method according to claim 1, wherein a difference between an SP value of the compound represented by the general formula (1) and an SP value of the resin particle is 5.0 $(cal/cm^3)^{1/2}$ or less.

10. The ink jet recording method according to claim 1, wherein an amount of an anionic group of the resin particle is 350 μmol/g or less.

11. The ink jet recording method according to claim 1, wherein the aqueous ink further comprises the compound represented by the general formula (1).

12. The ink jet recording method according to claim 1, wherein the reactant is an organic carboxylic acid of an acid form and the pKa thereof is 1.8 or more.

13. The ink jet recording method according to claim 12, wherein the organic carboxylic acid of an acid form has a plurality of carboxy groups.

14. The ink jet recording method according to claim 1, wherein the amount of water absorbed by the recording medium from the start of contact to 30 $msec^{1/2}$ in the Bristow method is 10 $mL/m^2$ or less.

15. The ink jet recording method according to claim 14, wherein the recording medium comprises a resin layer.

16. The ink jet recording method according to claim 1, wherein the aqueous ink and the reaction liquid are applied onto the recording medium, and then the recording medium is heated.

17. The ink jet recording method according to claim 16, wherein a difference between a heating temperature T(° C.) of the recording medium and a glass transition temperature Tg(° C.) of the resin particle (T-Tg) is −10° C. or more.

18. An ink jet recording apparatus equipped with an aqueous ink comprising a resin particle, a reaction liquid comprising a reactant for aggregating a component in the aqueous ink, and a recording head of an ink jet system which ejects the aqueous ink and the reaction liquid to apply the aqueous ink and the reaction liquid onto a recording medium,
wherein the reaction liquid comprises a compound represented by the following general formula (1),
at least one of the aqueous ink and the reaction liquid comprises a surfactant having an HLB value of 15 or less:

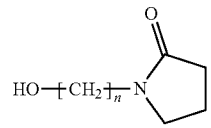

wherein, in the general formula (1), n represents an integer of 0 to 3, and
wherein the resin particle in the aqueous ink first contacts the compound represented by the general formula (1) in the reaction liquid on the recording medium.

19. The ink jet recording method according to claim 1, wherein a content (% by mass) of the compound represented by the general formula (1) in the reaction liquid is 7.0% by mass or more to 31.0% by mass or less based on the total mass of the reaction liquid.

20. The ink jet recording method according to claim 1, wherein a content (% by mass) of the resin particle in the aqueous ink is 1.0% by mass or more to 20.0% by mass or less based on the total mass of the aqueous ink.

* * * * *